US005568181A

United States Patent [19]

Greenwood et al.

[11] Patent Number: 5,568,181
[45] Date of Patent: Oct. 22, 1996

[54] MULTIMEDIA DISTRIBUTION OVER WIDE AREA NETWORKS

[75] Inventors: David G. Greenwood, Chapel Hill; David B. Lindquist, Raleigh, both of N.C.

[73] Assignee: International Business Machines Corporation, Armonk, N.Y.

[21] Appl. No.: 432,548

[22] Filed: May 1, 1995

Related U.S. Application Data

[63] Continuation of Ser. No. 164,174, Dec. 9, 1993, abandoned.

[51] Int. Cl.$^6$ .................................................. H04N 7/10
[52] U.S. Cl. ........................................ 348/7; 455/4.1
[58] Field of Search ............................ 348/6–8, 1, 12, 348/13, 467, 468, 478, 563; 370/419.19; 364/419.19, 401, 403; 455/4.1, 4.2, 5.1; 395/600; H04N 7/10

[56] References Cited

U.S. PATENT DOCUMENTS

| | | | |
|---|---|---|---|
| 4,506,387 | 3/1985 | Walter | 455/3 |
| 4,555,774 | 11/1985 | Bernstein | 364/900 |
| 4,890,320 | 12/1989 | Monslow et al. | 455/4.2 |
| 4,949,187 | 8/1990 | Cohen | 358/335 |
| 4,993,025 | 2/1991 | Vesel et al. | 370/94.1 |
| 5,014,125 | 5/1991 | Pocock et al. | 358/86 |
| 5,027,290 | 6/1991 | Kirk et al. | 364/521 |
| 5,051,845 | 9/1991 | Gardner et al. | 360/14.1 |
| 5,119,370 | 6/1992 | Terry | 370/60.1 |
| 5,132,992 | 7/1992 | Yurt et al. | 348/7 |
| 5,133,079 | 7/1992 | Ballantyne et al. | 348/7 |
| 5,172,413 | 12/1992 | Bradley et al. | 348/7 |
| 5,291,492 | 3/1994 | Andrews et al. | 370/110.1 |
| 5,414,455 | 5/1995 | Hooper et al. | 348/7 |
| 5,418,713 | 5/1995 | Allen | 364/403 |
| 5,465,213 | 11/1995 | Ross | 364/401 |

FOREIGN PATENT DOCUMENTS

WO9103112  3/1991  European Pat. Off. ......... H04H 1/00

OTHER PUBLICATIONS

W. D. Sincoskie, "System Architecture for a Large Scale Video On Demand System," *Computer Networks and ISDN Systems*, vol. 22, No. 2, Sep. 1991, Amsterdam, Netherlands.

*Primary Examiner*—Victor R. Kostak
*Assistant Examiner*—John W. Miller
*Attorney, Agent, or Firm*—Jerry W. Herndon; Robert O. Nimtz

[57] ABSTRACT

A video distribution management system utilizes a shared video library and a wide area network to deliver video files to local caches on the local area networks serving a subset of local viewing stations. A combination of direct local cache access, scheduled future local cache access and speed match distribution of video files makes the overall system both efficient and economical. In particular, a locally stored preface of a video file can be immediately viewed on the local area network while the balance of the video file is transmitted from the remote video library.

26 Claims, 5 Drawing Sheets

MULTIMEDIA DISTRIBUTION OVER WIDE AREA NETWORKS

This application is a continuation of application Ser. No. 08/164,174, filed Dec. 9, 1993 (now abandoned).

TECHNICAL FIELD

This invention relates to multimedia file distribution and, more particularly, to the use of existing wide area and local area networks for the distribution of multimedia files from a centralized repository for such files.

BACKGROUND OF THE INVENTION

Multimedia distribution systems have remained local area network systems (LANs) due to the lack of an available distributed multimedia infrastructure. In existing wide area networks (WANs), the available bandwidth is insufficient to support remote playback of video files, particularly in view of network-related problems such as network latency, jitter and limited throughput. As a result, a typical solution is to maintain large libraries of video files in a large number of geographically dispersed locations in order to provide reasonably rapid access for widely disbursed users. The cost of creation and maintenance of such multiple video libraries, along with the local distribution facilities, is often prohibitive for most users. In addition to the prohibitive cost, the difficulty in scheduling viewing and managing the local distribution of such videos makes video distribution systems rare and inefficient.

SUMMARY OF THE INVENTION

In accordance with the illustrative embodiment of the present invention, the distribution of video files over large geographical areas makes use of local video caches along with efficient distribution of such video files to the local caches. High speed local area networks are then able to deliver the video files locally from the local cache in real time, while a slower wide area network is able to transfer video files from one, or more centralized video storage libraries to the local caches at the slower, non-real time rates common to such wide area networks. More particularly, user access to video files utilizes one of three different algorithms, depending on the request and the local availability of a file. If the file is already available locally, for example, the user may obtain full access (browsing, playback, rewind and multiple viewing) over local area network facilities such as those currently available today. If a request specifies a future time for access, a remote file can be scheduled for transfer to the local cache at any convenient time or times prior to viewing. Finally, if a request specifies a video file which is not in the local cache, a "preface" of the video file is immediately transferred to the local cache. The preface is a predetermined initial portion of the video file having a playback duration just long enough to balance the time required to transfer the remainder of the video file to the local cache with the time to play back the entire video file. This latter type of file access is called "speed match" playback.

The combination of access algorithms used in the present invention provides an efficient strategy for accessing video files from one or more remote video file libraries and delivering those video files to a widely distributed geographical area at a reasonable cost over a relatively slow wide area network. The three algorithms can be combined by using a high usage video caching strategy. That is, the most frequently accessed video files and the most recently accessed video files can be loaded into local caches serving the most likely users, thus anticipating likely requests. More significantly, only the prefaces of such most frequently accessed video files need be loaded into the local caches since the balance of the video files can be subsequently transmitted in a timely fashion, using the speed match playback algorithm, after an actual request for the file has been received.

The video distribution management system (VDMS) of the present invention makes video distribution over a wide area network both economically and technically practical. Real time file access is provided from local caches over a high speed local area network while non-real time file service is provided over a slower speed wide area network on a scheduled or "speed match" distribution to local caches. While not all requests can be filled with these techniques, a sufficient number of requests can be filled within a reasonable length of time to render the video distribution system both technically and economically viable.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
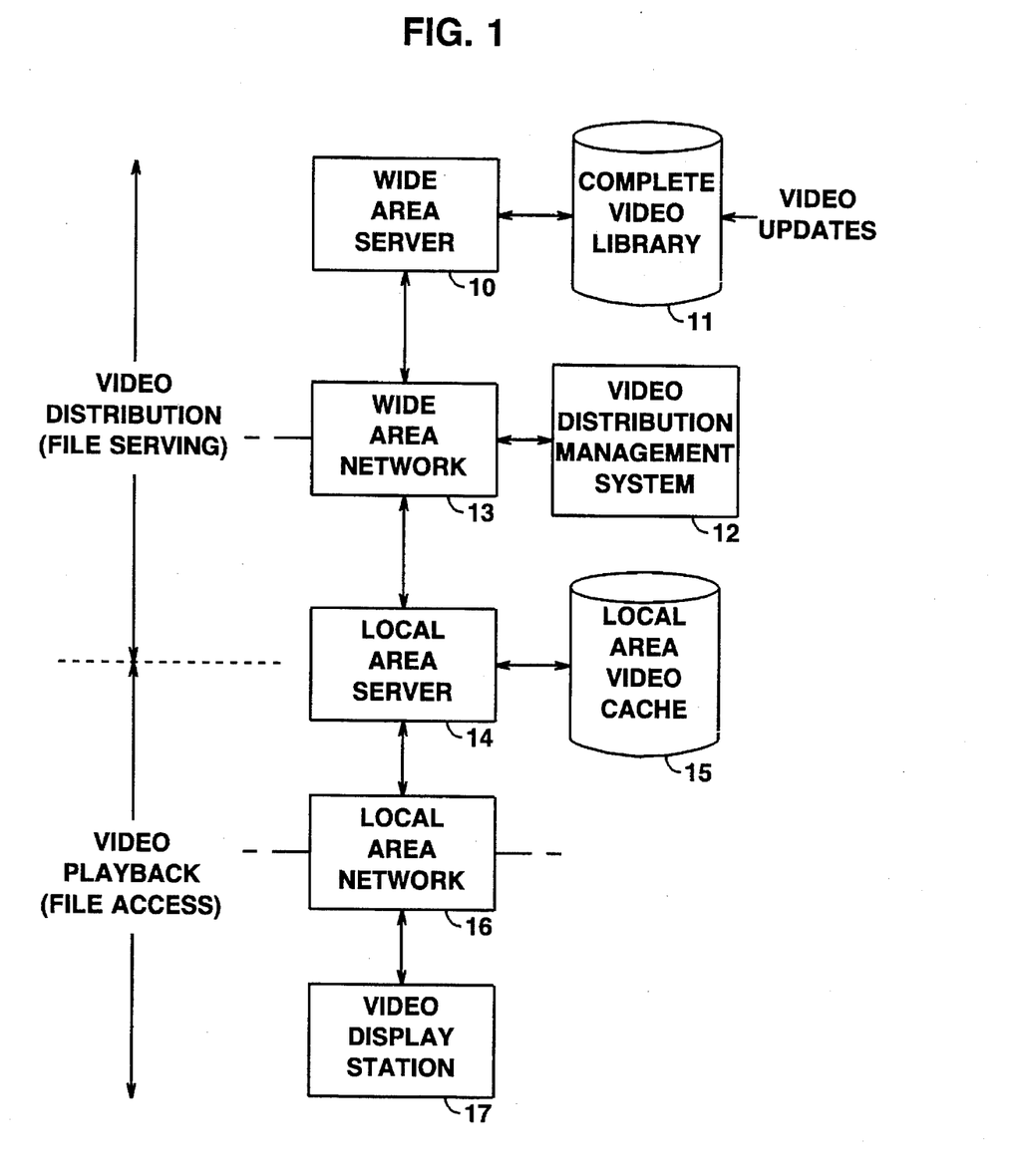
FIG. 1 shows a general block diagram of a video distribution system in accordance with the present invention utilizing both wide area networks and local area networks and local area video caches to support such video distribution.

Referring more particularly to FIG. 1, there is shown a general block diagram of an interactive video distribution system comprising a wide area network (WAN 13) and at least one local area network (LAN 16). WAN 13 is a point-to-point or switched data packet transmission system of the type well known in the art, over which communication is enabled using standard wide area protocols such as SNA/LU 6.2 as described in "SNA/LU 6.2 Reference: Peer Protocols," IBM Publication, 1990, and TCP/IP as described in Internetworking with TCP/IP, by Douglas Comer, Prentice Hall, Englewood Cliffs, N.J., 1988. LAN 16 is a backbone or ring configured, high speed data interconnection system such as ETHERNETr or Token Ring over which communication is enabled using standard local area protocols such as NetBIOS or TCP/IP as disclosed in Communications for Cooperating Systems: OSI, SNA and TCP/IP, by R. J. Cypser, Addison-Wesley, New York, 1991. While LAN 16 is capable of carrying wide band video data at a rate consistent with video playback, WAN 13 is not generally capable of carrying digital video data at the required rate.

One or more centralized video libraries such as library 11 are connected to WAN 13 by way of a wide area servers like server 10 which deliver video files from library 11 to WAN 13 on demand and at a rate which can be supported by WAN 13 but not generally at a rate consistent with video playback. Local area network 16 is appropriately connected to WAN 13 by way of local area server 14 which forms an interface between the high speed LAN 16 and the lower speed WAN 13. A local area cache storage facility 15 is connected to local area server 14 and provides a local storage facility for all or portions of copies of video files from video library 11. Video files in cache 15 can be delivered interactively and in real time to video display stations such as station 17 on LAN 16. Of course, LAN 16 serves a large number of video display stations like station 17, and all of such other video display stations can likewise receive video files from cache 15 interactively and in real time. Similarly, WAN 13 serves other local area networks which, like LAN 16, utilize their own local area video caches like cache 15 connected to local area servers like server 14. Together, video library 11, WAN 13 and all of these local area networks, each served by a local area server 14 and a local area cache 15, each in turn serving a plurality of viewing stations 17, comprise the video distribution system shown in FIG. 1.

The video distribution management portion of FIG. 1, providing file service functions, is comprised of the video library 11, the wide area server 10, WAN 13 and video distribution management system 12. The video playback portion, providing interactive video access, comprises local area server 14, LAN 16, local area video cache 15 and a plurality of video display stations like station 17. Local area server 14 serves as a rate changing interface between the high speed LAN 16 and the lower speed WAN 13. As will be described hereinafter, video distribution management system (VDMS) 12 receives requests from all of the video display stations, such as station 17, connected to all of the LANs, such as LAN 16, connected to WAN 13, and provides interactive playback of video files by downloading such video files from library 11 to local caches 15 at the transmission rate of WAN 13, and then provides interactive, real time video playback of these same files from local cache 15 to stations 17 over LAN 16.

Figure 2:
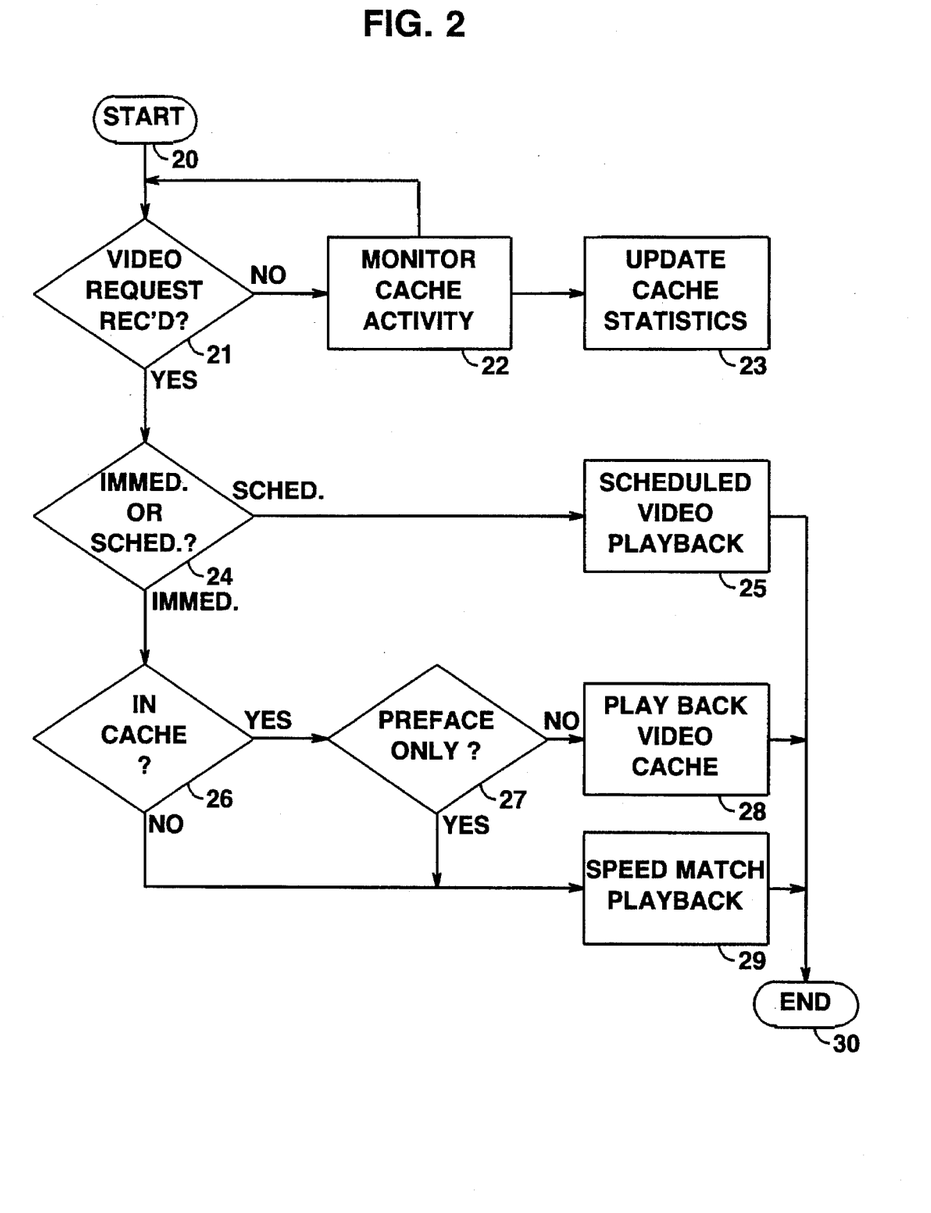
FIG. 2 shows a general flow chart of the video distribution management system show in FIG. 1, depicting the three alternative access algorithms of the present invention.

In FIG. 2 there is shown a general flow chart of the video distribution management system (VDMS) 12 of FIG. 1. Starting at start box 20, the flow chart of FIG. 2 enters decisions box 21 where it is decided whether or not a video request has been received by VDMS 12 from any of the stations, similar to station 17, connected to the video distribution system of FIG. 1. If no video request has been received, box 22 is entered where information regarding the most recent activity in the local video caches like cache 15 of FIG. 1 is collected and, in box 23, stored for later reference. Such cache activity can be monitored, for example, by counting the number of times each video file has been accessed and by recording the date and time at which each video file was accessed. Other ordering algorithms can be used to select the most active video files. By ordering a set of identifiers for all of the video files currently in each local cache from most active to least active, candidates for deletion from that cache can be determined. These "cache statistics" can subsequently be used should it become necessary to make space in the cache (by removing little-used resident files) if requests for video files not presently in the cache are received. This information is used in both scheduled video playback and in speed match video playback, as described below. Following the update of the cache statistics in box 23, decision box 21 is re-entered to await the receipt of the next video request or to repeat the cache monitoring process in box 22 described above.

If a video request is present, as determined in decision box 21, decision box 24 is entered where it is determined whether the request is for immediate viewing of the video file or the request is for scheduling a future viewing of the video file. If the request is for scheduling a future viewing of the video file, box 25 is entered where the future video playback is scheduled, as will be described in detail in connection with the flow chart of FIG. 3.

If the request is for immediate viewing, as determined in decision box 24, decision box 26 is entered to determine whether or not the requested video file is in the local cache, corresponding to cache 15, serving the local area network, corresponding to LAN 16, from which the request originated. If the video file is in the local cache, decision box 27 is entered where it is determined whether or not the entire video file is in the local cache, or whether only a preface of the video file is in the local cache. For the purposes of the present invention, a preface to a video file is an initial portion of the video file having a duration which is adequate, when viewed in real time at a user station such as station 17, to permit the transmission of the balance of that video file from the remote library 11 to the local cache over the WAN 13 such that the video can be played continuously and without interruption. The calculation of the length of such prefaces is shown in detail in FIG. 5, to be described in detail hereinafter.

If the entire video file is in the local cache, rather than only the preface of that file, as determined by decision box 27, box 28 is entered to allow fully interactive real time playback of the video file from the local cache to the user station over the interconnecting local area network. Interactive, real time playback includes such things as pause, rewind, and multiple viewings of the same video file at a rate consistent with continuous video playback. If only the preface of the video file is in the local cache, as determined by decision box 27, box 29 is entered where so-called "speed match" playback takes place for that video file. As will be described in detail in connection with FIG. 4, speed match playback involves the interactive viewing of an initial portion of the video file while the balance of that video file is being delivered to the local video cache from the library 11 over WAN 13. If the requested video file is not is the local cache, as determined by decision box 26, the same speed match playback algorithm of box 29 is used, but requiring the initial transmission of the preface for viewing before the transmission of the balance of the video file.

The multiple strategies of the video distribution management system of the flow chart of FIG. 2 efficiently matches the high speed access capabilities of existing local area networks with the lower speed distribution capabilities of existing wide area networks to provide an economical overall video distribution system in accordance with the present invention.

Figure 3:
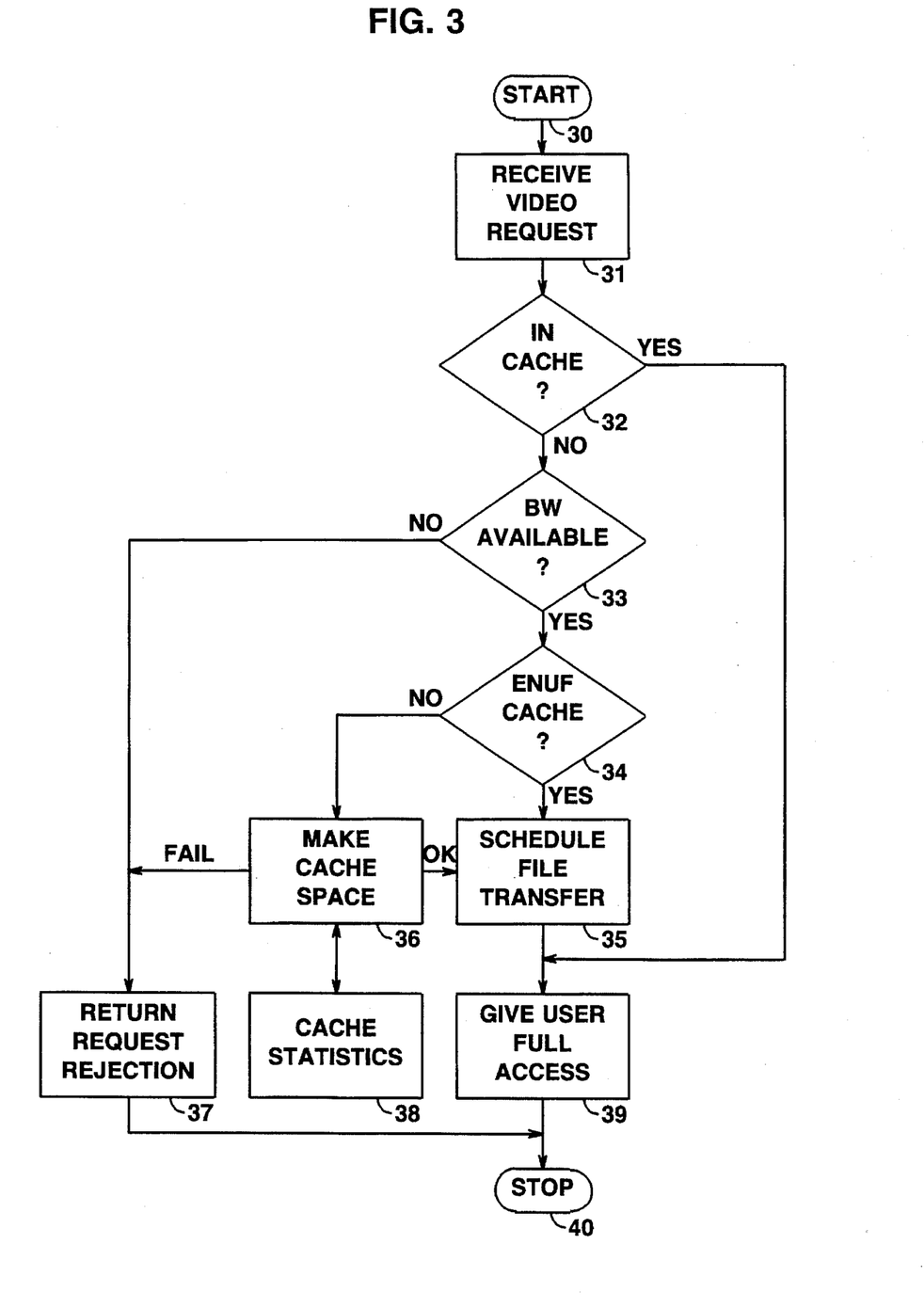
FIG. 3 shows a detailed flow chart of the scheduled video playback algorithm shown in general form in FIG. 2.

In FIG. 3 there is shown a flow chart of the scheduled video playback process suggested in box 25 of FIG. 2. In FIG. 3, the scheduled playback process starts in start box 30 where box 31 is entered to receive the scheduled playback request, parameterized by such attributes as video file name, date and time required, and so forth, transmitted from a viewing station, such as station 17 of FIG. 1, over a local area network, such as LAN 16, through a local area server such as server 14 to video distribution management system 12 of FIG. 1. In FIG. 3, decision box 32 is entered where it is determined whether the requested video file is in the local cache. This determination can be made alternatively by keeping a record of the contents of all local area caches in VDMS 12, or by launching an inquiry to the local area cache in response the receipt of the request.

If the requested video file is already in the local cache, possibly in response to a previous user requesting this video file and this file not yet having been deleted from the cache, box 39 is entered where the requesting viewing station can be given full interactive access to the video file in the local cache at any time, particularly at the time indicated in the video request. The process can then be terminated in stop box 40. If, however, the requested video file is not in the local cache when the request is received, as determined by decision box 32, decision box 33 is entered where it is determined whether or not adequate bandwidth is available in WAN 13 to transmit the video file from the library 11 to the local cache similar to cache 15 in FIG. 1, in sufficient time to meet the schedule. If sufficient bandwidth is not available to transfer the video file in time to meet the schedule, as determined by box 33, box 37 is entered to return a rejection of the request, or an alternative schedule, to the requesting station. The process is then terminated in stop box 40.

If adequate bandwidth is available in WAN 13 to transmit the requested video file from library 11 to the local cache, as determined by decision box 33, decision box 34 is entered where it is determined whether or not there is sufficient storage capability remaining in the local cache (like cache 15 in FIG. 1) to hold the requested video file. If it is determined in decision box 34 that there is insufficient storage capacity available in the local cache, box 36 is entered where the cache statistics, supplied from cache statistics box 38, are used to determine which of the least active files can be deleted to "make space" for the requested video file. These cache statistics are created and updated as shown in FIG. 2 by boxes 22 and 23, and include an ordered list of video file activity. Files which have the least activity should and can be deleted to make space for newly requested video files. In this way, the video cache will always contain those files most frequently requested and most recently accessed. If it is determined in box 36 that sufficient space can be created to hold the requested video file, box 35 is entered where the required video file transfer is actually scheduled. If, on the other hand, sufficient storage space cannot be created, box 37 is entered to return a rejection of the request. The process terminates in stop box 37.

If it is determined in decision box 34 that sufficient storage capacity exists in the local cache to hold the requested video file, box 35 is entered to schedule the video file transfer. This scheduling is designed to ensure the arrival of the video file prior to the scheduled viewing time, and, at the same time, optimize the use of WAN 13. Once the video file is in the local cache, box 39 is entered where the requesting user is given full access to the video file. The process is thereafter terminated in stop box 40. In optimizing the use of WAN 13 for video file transfers, a number of scheduled video requests may be simultaneously outstanding from a number of viewing stations. The overlap of their required use of WAN 13 to transfer the video files can be accommodated by appropriately scheduling the outstanding transfers such that WAN 13 is seldom idle and such that each schedule is still met.

It can be seen that the scheduled video playback process of FIG. 3 optimizes the use of the wide area network 13 of FIG. 1 while, at the same time, makes the use of a remote video library 11 economically feasible. As will be described hereinafter, this scheduled video playback can be combined with the speed match process to be discussed in connection with the flow chart of FIG. 4 to further enhance the efficiency of the overall system.

Figure 4:
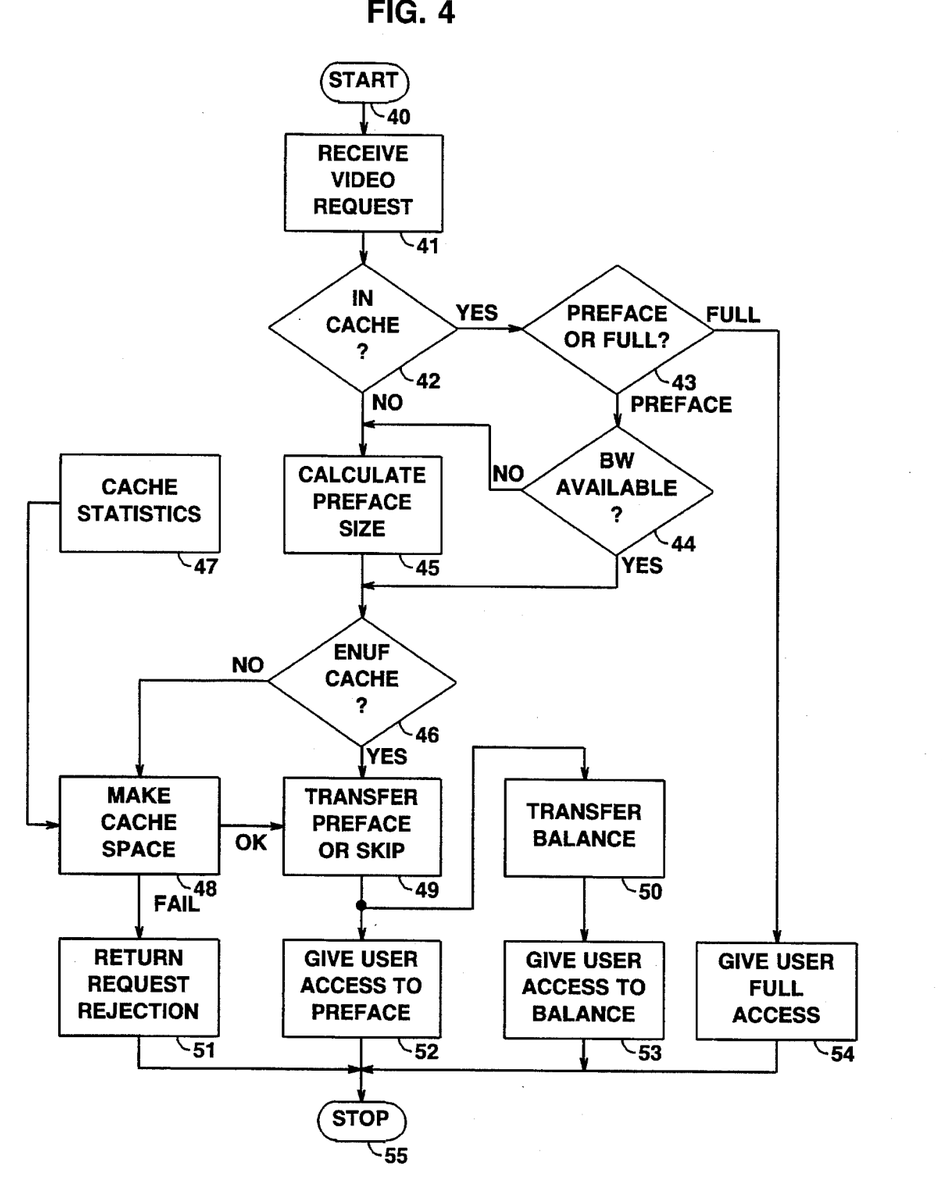
FIG. 4 shows a detailed flow chart of the speed match playback algorithm in which initial prefaces of video files are transferred for user access prior to the transfer of the balance of the video file, while maintaining continuous user access and playback.

In FIG. 4 there is show a flow chart of the so-called "speed match playback" process described in general terms in connection with box 29 of FIG. 2. Starting in start box 40, box 41 is entered where the video request is received in the video distribution management system 12 of FIG. 1. In decision box 42, it is determined whether or not the requested video file is in the local cache. If the requested video file is in the local cache, box 43 is entered to determine if the full video file is in the cache, or only the preface of that video file. For the purposes of the present invention, a preface to a video file is an initial portion of the video file having a duration which is adequate to permit the transmission of the balance of that video file from the remote library 11 to the local cache over the WAN 13, while permitting viewing of the entire video file without interruption at the user station such as station 17 of FIG. 1. The process for calculating the appropriate size of the preface is shown in the flow chart of FIG. 5, to be described hereinafter.

If it is determined in decision box 43 that the full video file is present in the local cache, box 54 is entered immediately to give the user full access to the video file. The process is then terminated in stop box 55. If, however, only the preface is held in the local cache, decision box 44 is entered to determine whether there is sufficient bandwidth currently available in WAN 13 to transmit the balance of the video file at a rate consistent with the size of the preface. If there is currently insufficient bandwidth available, as determined by decision box 44, box 45 is entered to recalculate an appropriate preface size that matches the currently available bandwidth in WAN 13. If it is determined that sufficient bandwidth is available, decision box 46 is entered to determine if there is sufficient local cache storage capacity to hold the balance of the video file. The process continues thereafter the same as from box 45.

If it is determined in decision box 42 that the requested video file is not in the local cache, box 45 is entered where the relationship between the bandwidth available on WAN 13, the size of the video file, and the rate at which the video file is played back to the user station are used to determine the size of the preface required for speed match playback, as discussed in connection with FIG. 5. Once the size of the preface is calculated in box 45, decision box 46 is entered where it is determined whether there is enough local cache storage capacity to accommodate either the entire video file, if the preface is not already in the cache, or the balance of the video file if the preface is already present in the cache. If it is determined that there is insufficient local cache to store the video file, box 48 is entered where, as was described in detail for box 36 of FIG. 3, the cache statistics from box 47 are used to recover space in the local cache. When using the speed match playback process, however, the entire least active video file need not be deleted. If the preface of the file to be deleted is retained in the cache and only the balance of the file deleted, then the overall performance of the video distribution system is further enhanced. Any subsequent request for that video file will find the preface still in the cache to permit immediate access for playback. In effect, a hybrid speed match and direct video cache retrieval technique can thus be used for providing essentially transparent local area access to the remote video library 11.

If it is determined in box 48 that sufficient space can be made available to hold the requested video file, box 49 is entered where the transfer of the preface actually occurs. If, on the other hand, sufficient storage capacity cannot be created by the make space process of box 48, box 51 is entered to return a rejection of the request. The process then terminates in stop box 55. If it is determined in decision box 46 that there is sufficient storage capacity in the local cache to hold the video file, or if the make space process of box 48 succeeds, box 49 is entered where the transfer of the preface of the requested video file actually occurs. If, on the other hand, the preface is already in the local cache (by way of boxes 42 and 43), then this step is skipped and the process continues in boxes 50 and 52. To transfer the preface of the video file, any file transfer method known in the art can be used such as a technique which exploits the sockets programming interface with the TCP/IP communications protocol, as described in the Comer text identified above.

After completing the transfer of the preface of the video file from the remote video library 11 to the local cache 15 over WAN 13, two actions are taken simultaneously. Box 52 is entered where the user is given full access to the preface of the video file; box 50 is simultaneously entered where the transfer of the balance of the requested video file is initiated. The user has full access to the preface and to that portion of the balance of the video file already transferred to the local video cache. This gives the user real time, continuous playback of the video file at the user station such as station 17 in FIG. 1. After initiation of the transfer of the balance of the video file to the local cache in box 50, box 53 is entered where the user is given access to the balance of the video file while not exceeding that portion which is currently in the local cache. In this way, the user can begin and continue video playback while the file is actually being transferred into the local cache. The process terminates in stop box 55 once the entire balance of the video file has been transferred to the local cache.

Figure 5:
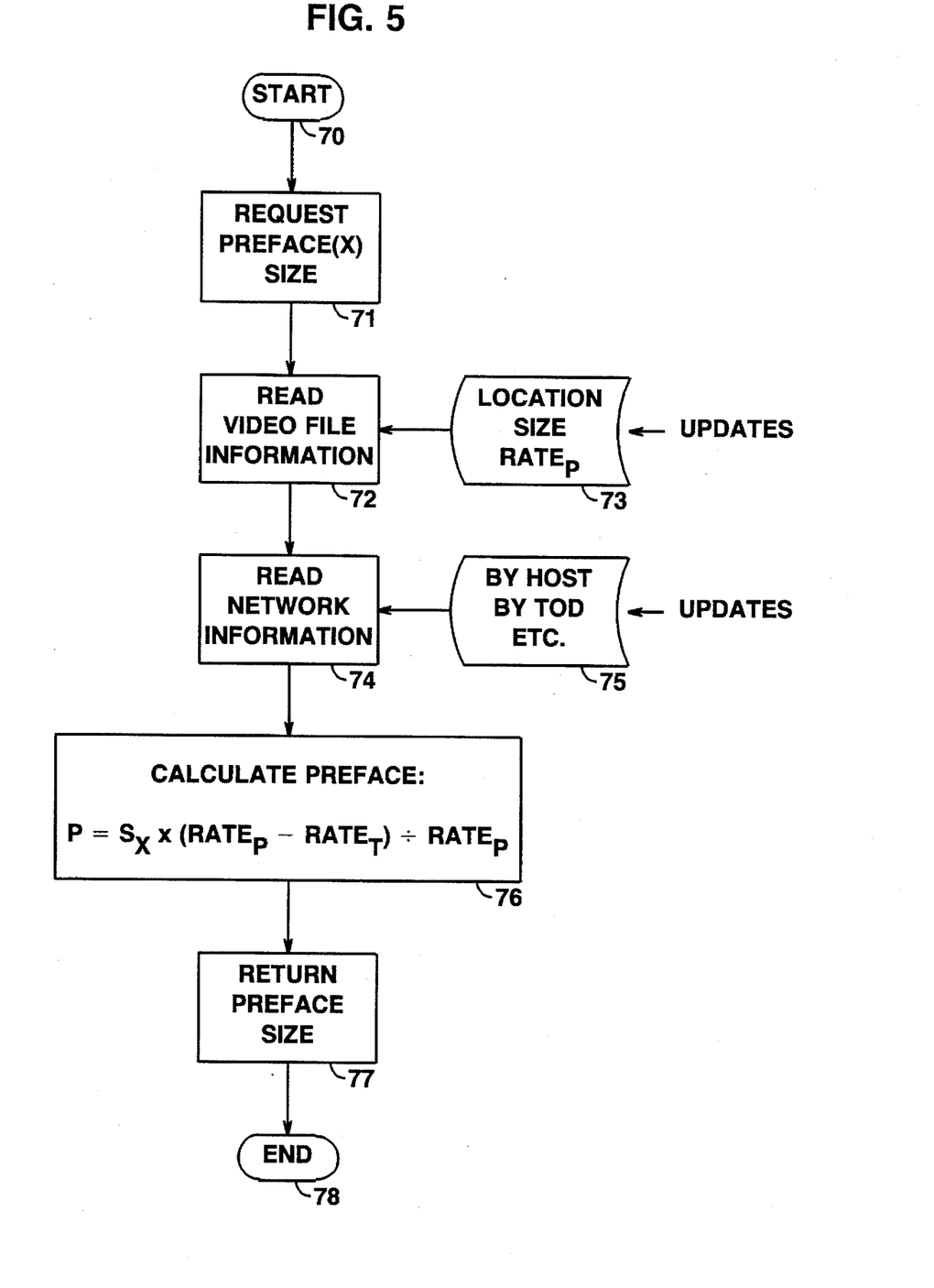
FIG. 5 shows a detailed flow chart of the preface calculation algorithm by means of which the size of a video preface is determined prior to the transfer of such a preface in the flow chart of FIG. 5.

In FIG. 5 there is shown a flow chart of the preface calculation algorithm used in box 45 of FIG. 4. Starting in start box 70, box 71 is entered where the request for the size of the preface for a file "X" is received. In order to calculate the size of the preface, box 72 is entered where information concerning the video file "X" is obtained from a data storage device 73. Data store 73 is, of course, continually updated as new video files are added to or removed from library 11 in FIG. 1. This information includes, among other things, the size of the requested video file "X" and the rate ($RATE_P$, where P stands for playback) at which that file "X" must be accessed to provide real time viewing of the file. Thereafter, in box 74, information concerning the state of WAN 13 (FIG. 1) is obtained from data storage device 75. The information in store 75 is supplied by the host computer operating all or part of the WAN 13 or a node thereof, or by other facilities in the network, and varies by time-of-day (TOD), network loading, congestion conditions, and other traffic-dependent parameters. This information is continually updated, and includes, among other things, the rate ($RATE_T$, where T stands for Transfer) at which the identified video file "X" can be transmitted through WAN 13 from library 11 to local cache 15.

The information obtained in boxes 72 and 74 is used in box 76 to calculate the size of the preface in accordance with the formula:

$$Size_{Preface}=Size_X=(Rate_{playback}-Rate_{Transfer})/Rate_{playback}$$

This preface size value is returned to the speed match box 53 of FIG. 5 in box 77. The process is terminated in stop box 78.

It can be seen that the processes described in FIGS. 2 through 5 cooperate to provide efficient and economical distribution of video files from a remote video library to a large number of widely distributed video file users, using a wide area network and a plurality of local area networks as the transmission vehicles for such video distribution.

It should be clear to those skilled in the art that further embodiments of the present invention may be made by those skilled in the art without departing from the teachings of the present invention.

What is claimed is:

1. A method of controlling the distribution of full motion video files, comprising the steps of determining if a cache at a network server contains a requested video file responsive to a request from a viewing station to view the video file, requesting the transmission of the requested file from a shared video library at a rate lower than a real time playback rate of the video file in the event the cache does not contain the requested file, and activating the transmission of the requested video file in the cache to the viewing station at a real time playback rate.

2. The method of claim 1 further comprising the steps of in response to a request from a station containing a time of playback of the requested file and to a determination that the requested file is not in the cache, determining if the file can be obtained from a library of video files at a rate lower than the real time playback rate of the video file by the requested playback time, and denying the request if the requested file cannot be obtained at the lower rate by the requested time.

3. The method of claim 1 further comprising the steps of determining if the cache contains a preface of the requested file, wherein a preface is an initial portion of a video file sufficient to play at a real time playback rate such that the remainder of the file can be obtained at the lower transmission rate from a shared library of video files by the time the preface is played, and obtaining the portion of the requested file not in the cache from a shared library concurrently with the transmission of the preface to the requesting station from the cache.

4. The method of claim 3 further comprising the step of continuing the transmission of the remaining portion of the file obtained from the shared library to the requesting station at the completion of transmission of the preface so as to provide uninterrupted playing of the requested file to the requesting station.

5. Apparatus for controlling the distribution of full motion video files to viewing stations, comprising means for transmitting a video file from a full motion video file cache to a viewing station at a rate suitable for real time playback of the file, means for determining if the cache contains a file requested by the viewing station, means for requesting a transmission of the requested file from a shared video file library at a rate lower than the real time playback rate of the file in the event the cache does not contain the requested file, and means for activating the transmitting means when the requested file is in the cache thereby to transmit the requested file to the viewing station at a real time playback rate.

6. The apparatus of claim 5 wherein said determining means further comprises second means responsive to a requested time of transmission of a video file contained in a request from a viewing station and to a determination that the cache does not contain the requested file for determining if the file can be obtained at the lower transmission rate from the shared library by the requested time, and means for denying the request if the requested file cannot be obtained by the requested time.

7. The apparatus of claim 5 wherein said determining means further comprises second means for determining if the cache contains a preface of the requested file, wherein a preface is an initial portion of a video file sufficient to play at a real time playback rate such that the remainder of the file can be obtained at the lower transmission rate by the time play of the preface is complete, and means activated by the second determining means for obtaining the portion of the requested file not in the cache at the lower transmission rate concurrently with the transmission of the preface from the cache to the requesting station.

8. The apparatus of claim 7 further comprising means responsive to a completion of transmission of a preface to a requesting station for continuing transmission of the remaining portion of the file obtained from the shared library so as to provide uninterrupted playing of the requested file at the requesting station.

9. A method of distributing full motion video files in a video distribution system comprising the steps of storing a plurality of video files in a shared video file library, transmitting video files from a full motion video file cache in a local network to a plurality of viewing stations at a real time playback rate of said video files for viewing at said stations concurrently with the transmissions, connecting a wide area network to the shared video library to transmit video files stored at the shared library to the local network at a rate lower than the real time playback rate of said video files, determining if the cache contains a requested file responsive to a request from a viewing station to view the video file, activating the transmission of the requested file from the shared video library to the cache via the wide area network responsive to the request from the requesting station in the event the cache does not contain the requested file, and activating the transmission of the requested video file in the cache to the viewing station at a real time video viewing rate.

10. The method according to claim 9 further comprising the step of dividing at least one of said video files into two parts, a first part or preface for transmission on said local network at the real time playback rate, and a second part for transmission on said wide area network at the lower transmission rate of said wide area network over the duration of the playback of the entire said video file, and continuing the transmission of the second part to the requesting station on the local network at the completion of the first part so as to provide uninterrupted play of the requested file at the requesting station.

11. The method according to claim 10 further comprising the step of monitoring use statistics of each of said video files, and transferring video file prefaces from said library to said local cache in response to said use statistics.

12. A method according to claim 9 further comprising the step of monitoring use statistics of each of said video files, and transferring entire video files from said library to said local cache in response to said use statistics.

13. The method according to claim 12 further comprising the step of providing complete access to video files or video file prefaces in said local cache by any one of said viewing stations on demand.

14. The method according to claim 9 further comprising the step of scheduling delivery of a video file from said shared library to said local cache prior to a requested viewing time for that video file.

15. The method of claim 9 further comprising the steps of in response to a request from a station containing a time of playback of a requested file and to a determination that the requested file is not in the cache, determining if the file can be transmitted on the wide area network to the cache by the requested playback time, and denying the request if the requested file cannot be transmitted to the cache by the requested time.

16. The method of claim 9 further comprising the steps of determining if the cache contains a preface of the requested file, wherein a preface is an initial portion of a video file sufficient to play at a real time viewing rate such that the remainder of the file can be obtained at the lower transmission rate of the wide area network by the time play of the preface is completed, and obtaining the portion of the requested file not in the cache from the shared library concurrently with the transmission of the preface to the requesting station from the cache.

17. The method of claim 16 further comprising the steps of continuing the transmission of the remaining portion of the file obtained from the shared library to the requesting station at the completion of transmission of the preface so as to provide uninterrupted playing of the requested file at the requesting station.

18. A full motion video file distribution system comprising a shared video file library for storing a plurality of video files, a local network containing a full motion video file cache, said local network comprising means for transmitting video files from said cache to a plurality of viewing stations at a real time playback rate of said video files for viewing at said stations concurrently with the transmissions, a wide area network connected to the shared video library for transmitting video files stored at the shared library to the local network at a rate lower than the real time playback rate of said video files, means in the local network responsive to a request from a viewing station to view a video file for determining if the cache contains the requested file, means responsive to the determining means for activating the transmission of the requested file from the shared video library to the cache via the wide area network in the event the cache does not contain the requested file, and means for activating the transmission of the requested video file in the cache to the viewing station at a real time playback rate.

19. The video file distribution system according to claim 18 further comprising means for dividing at least one of said video files into two parts, a first part or preface for transmission to a requesting station on said local network at the real time playback rate, and a second part for concurrent transmission on said backbone network to the cache at the transmission rate of said wide area network, and means for continuing transmission of the second part to the requesting station on the local network at the completion of the first part so as to provide uninterrupted play of the requested file at the requesting station.

20. The video file distribution system according to claim 19 further comprising means for monitoring use statistics of each of said video files, and means for transferring video file prefaces from said shared library to said local cache in response to said use statistics, wherein a preface is an initial portion of a video file sufficient in length such that the remainder of the file can be obtained at the transmission rate of the backbone network by the completion of transmission of the preface at the real time playback rate of the located network.

21. The video file distribution system according to claim 18 further comprising means for monitoring use statistics of each of said video files, and means for transferring video files from said shared library to said local cache in response to said use statistics.

22. The video file distribution system according to claim 21 further comprising means for providing complete access to complete or partial video files in said local cache by any one of said viewing stations on demand.

23. The video file distribution system according to claim 18 further comprising means for scheduling the delivery of a video file from said shared library to said local cache prior to a requested viewing time for that file.

24. The system of claim 18 wherein said determining means further comprises second means responsive to a requested time of transmission of a video file contained in a request from a viewing station and to a determination that the cache does not contain the requested file for determining if the file can be transmitted from the wide area network to the cache by the requested time, and means for denying the request if the requested file cannot be transmitted to the cache by the requested time.

25. The system of claim 18 wherein the determining means further comprises second means for determining if the cache contains a preface of the requested file, wherein a preface is an initial portion of a video file sufficient to play at a real time playback rate such that the remainder of the file can be obtained at the lower transmission rate of the wide area network by the time the preface is played, and means activated by the second determining means for requesting concurrent transmission of the portion of the requested file not in the cache and the transmission of the preface from the cache to the requesting station.

26. The system of claim 25 further comprising means responsive to a completion of transmission of a preface to a requesting station for continuing the transmission of the remaining portion of the file obtained from the shared library so as to provide uninterrupted playing of the requested file at the requesting station.

* * * * *